(12) United States Patent
Brown

(10) Patent No.: US 11,691,727 B1
(45) Date of Patent: Jul. 4, 2023

(54) LAW ENFORCEMENT STANDOFF INSPECTION DRONE

(71) Applicant: George Bacon Brown, Stafford, VA (US)

(72) Inventor: George Bacon Brown, Stafford, VA (US)

(*) Notice: Subject to any disclaimer, the term of this patent is extended or adjusted under 35 U.S.C. 154(b) by 232 days.

(21) Appl. No.: 17/015,068

(22) Filed: Sep. 8, 2020

Related U.S. Application Data

(60) Provisional application No. 62/896,963, filed on Sep. 6, 2019.

(51) Int. Cl.
| | | |
|---|---|---|
| *B64C 39/02* | (2023.01) | |
| *B64D 27/24* | (2006.01) | |
| *B64F 1/36* | (2017.01) | |
| *B64F 1/22* | (2006.01) | |
| *B60L 50/60* | (2019.01) | |
| *B60L 53/00* | (2019.01) | |
| *G05D 1/10* | (2006.01) | |
| *B64D 47/02* | (2006.01) | |
| *B64U 10/13* | (2023.01) | |
| *B64U 50/19* | (2023.01) | |
| *B64U 80/86* | (2023.01) | |
| *B64U 101/30* | (2023.01) | |

(52) U.S. Cl.
CPC ............ *B64C 39/024* (2013.01); *B60L 50/60* (2019.02); *B60L 53/00* (2019.02); *B64D 27/24* (2013.01); *B64D 47/02* (2013.01); *B64F 1/222* (2013.01); *B64F 1/364* (2013.01); *G05D 1/101* (2013.01); *B60L 2200/10* (2013.01); *B64U 10/13* (2023.01); *B64U 50/19* (2023.01); *B64U 80/86* (2023.01); *B64U 2101/30* (2023.01); *B64U 2201/20* (2023.01)

(58) Field of Classification Search
None
See application file for complete search history.

(56) References Cited

U.S. PATENT DOCUMENTS

| | | | | |
|---|---|---|---|---|
| 2017/0253330 A1* | 9/2017 | Saigh | .................. | G08G 5/0069 |
| 2018/0050800 A1* | 2/2018 | Boykin | .................. | G10L 25/51 |
| 2020/0192089 A1* | 6/2020 | Haddick | ................. | G06F 3/005 |
| 2020/0272144 A1* | 8/2020 | Yang | .................... | B64C 39/024 |

* cited by examiner

*Primary Examiner* — Jelani A Smith
*Assistant Examiner* — Davin Seol

(57) ABSTRACT

The law enforcement standoff inspection drone capability (L-SID) integrates Various technology to enable a capability implemented at the squad car level to allow the first-to-scene the ability to remotely pre-screen the scene for threat, before an on-foot approach. This is accomplished with an officer launched and controlled and specially configure small unmanned aircraft system (UAS). The LAS is integrated with a specially configured one-hand drone controller, a wearable see through heads-up-display glasses, microphone that's linked to the UAS's onboard loudspeaker, and a special processing that enables looking through a vehicle of building tinted windows during enforcement event. The system operates on a private ad-hoc network, implements IEEE 802.1 1 g/n WPA 3 standards, and provides continuous live steamed scene data throughout the enforcement event. All data and video collected is transmitted in real-time to headquarters.

7 Claims, 11 Drawing Sheets

LAW ENFORCEMENT STANDOFF INSPECTION DRONE

CROSS REFERENCE TO RELATED APPLICATION(S)

This application claims the benefit under 35 U.S.C. § 119(e) of a U.S. Provisional application filed on Sep. 6, 2019 in the U.S. Patent and Trademark Office and assigned Ser. No. 62/896,963, the entire disclosure of which is hereby incorporated by reference.

STATEMENT REGARDING FEDERALLY SPONSORED RESEARCH OR DEVELOPMENT
Not Applicable

REFERENCE TO SEQUENCE LISTING

Not Applicable

BACKGROUND OF THE INVENTION

FIELD OF THE INVENTION

The present disclosure relates to techniques and methods for a Law Enforcement Standoff Inspection Drone Capability (L-SID), and more particularly implementation of L-SID systems at the squad car level to provide a first-to-scene (FTS) with a standoff capability to scout or prescreen a scene before initiating an on-foot approach. This especially important before approaching a vehicle with tinted window or a suspicious scene environment that present visual obstructions and barriers. In these situations, it is essential to maintain real-time scene situational awareness throughout the enforcement event to include the egress or return to squad car.

DESCRIPTION OF THE RELATED ART

The use of drones or unmanned aircraft systems (UASs) in law enforcement and public safety is growing. However, drones/UAS use have limitations due to their impact on safety in the national airspace. Title 14 of the Code of Federal Regulations Part 107 or Federal Aviation Administration (FAA) Part 107 regulations set rules for the use of small UAS flight in the National Airspace System. FAA Part 107 or Part 107 created the legal framework for commercial drone/UAS flight in the U.S. Part 107 requires that anyone flying a drone/UAS commercially must hold a Remote Pilot Certificate. Aside from this requirement Part 107 also enforces several restrictions on drone/UAS flight. These restrictions include for example, not flying drones/UAS over people or moving vehicles, must fly during the day, must fly under 400 feet above ground level (AGL), flying only within visual line-of-sight, and always yielding the right of way to manned aircraft. The FAA does have a Part 107 Waivers process and commercial remote pilots may request to fly specific drone/UAS operations not allowed under the rules by requesting an operational waiver. Drone/UAS flight restrictions apply to hobbyist or recreational pilots. They are required to abide by community, municipality, and FAA constraints to include obtaining approval prior to any flights in controlled airspaces. An example is areas near airports where you must obtain prior approval through the Low Altitude Authorization and Notification Capability (LAANC). Many law enforcement UAS programs are operated under Part 107 compliance and require their pilots to hold a FAA Remote Pilot Certificate. Part 107 compliance requires meticulous prior planning for each mission and must take into considerations the associated logistics and lead times. In addition, there are States that restrict law enforcement use of drones and in some instances require a search warrant before their use for certain missions. These and other factor have limited the use of law enforcement UAS mission sets primarily to accident scene data collection, search and rescue efforts, traffic monitoring and support, surveillance task requiring search warrants, and flight routines that may transition controlled airspace and other drone flight regulations. There are very few opportunities to respond in real-time for emergent events with current operational capabilities. A recent study of law enforcement fatalities between 2010-2016, sponsored by Community Oriented Policing Services (COPS) U.S. Department of Justice in partnership with the National Law Enforcement Officers Memorial Fund (NLEOMF) was designed to enhance the safety of law enforcement officers across the U.S.. The study reported revealing, trends in multiple categories including an analysis of ambush deaths over a seven-year period. This included the number of fatal encounters that were the result of officers taking self-initiated action, such as making a traffic stop or stopping a suspicious person. The study revealed that 81 officers were killed in ambush-style shootings between 2010 and 2016, and 20 other officers were shot and wounded during those instances. Accordingly, there could be meaningful safety benefits from a portable UAS capability that can be deployed by any law enforcement officer happening upon an emergent or self-initiated enforcement event.

The above information is presented as background information only to assist with an understanding of the present disclosure. No determination has been made, and no assertion is made, as to whether any of the above might be applicable as prior art with regard to the present disclosure.

SUMMARY OF THE INVENTION

Aspects of the present disclosure are to address at least the above-mentioned problems and/or disadvantages and to provide at least the advantages described below. Accordingly, an aspect of the present disclosure is to provide the law enforcement standoff inspection drone capabilities (L-SID), primarily for law enforcement and security use only. It is implemented at the squad car level to provide a first-to-scene (FTS) capability for both day and night operations. Upon deployment, the L-SID drone/UAS feeds live streaming video and data directly to the officer's headset. In a semi-autonomous flight profile, it maneuvers to scout and pre-screen a scene inspecting vehicles, enclosures, and obstructions identifying hazards to mitigate possibilities of an ambush or unexpected consequences. The intended operational environment consists of flight routines at altitudes between 15 feet and 30 feet AGL. In the case of fleeing suspects, altitudes may be increased up to 75 feet AGL to provide a larger visual vantage point and improved situational awareness data. L-SID drones/UAS will be programmed to a maximum flight altitude limit of 80 feet AGL to prevent impacts to airspace safety. Routine flight operations will occur primarily in Class G or uncontrolled airspace. Operators are not expected to be FAA Part 107 certified drone/UAS pilots however, they will require training to gain basic knowledge for safe use of the system. L-SID system integrates multiple technologies, processes, and operate on a private encrypted wireless network. The system enables continuous real-time scene situational awareness capability at the individual officer and squad car level. In addition to officer and scene safety, L-SID features enable the ability for enforcement transparency and provides a succinct process addition that will enhance enforcement safety for all involved. All scene data captured is transmitted to the squad car's on-board computer for further dissemination in real-time to a command center or headquarters for use or storage as may be required. The L-SID system comprises five networked component subsystems, a). Drones/UAS(s) with a specified configuration requirement, b). one-handed pistol grip radio frequency (RF) remote drone/UAS controller unit (PCU), c). Officer worn "see thru" augmented video heads-up-display (HUD) glasses (HDG), d). dual mode microphone headset with dual mode and direct link to drone loudspeaker, e). Data and Network Processing Unit (DPU) with specified functional capabilities. Functions of the DPU include executing the algorithm that provides the system capability to see through an automobile tinted glass window and enhanced visibility in inclement weather. Upon arriving on a scene, officers with squad cars outfitted for L-SID, can sync their individual HDG into the FTS network to receive the scene live streaming video and situational awareness data. Mechanical accessories or apparatuses that enables L-SID operational capabilities are, a). an overhead storage rack (OSR) that is mounted to the squad car interior ceiling and stores the L-SID drone/UAS, and b). an L-SID drone/UAS Launch/Recovery Pad platform (LRP) that is of "clear see thru material" and mounted on the driver's door and unfolds or slides out to provide LRP.

Another aspect of the present disclosure is the use of the L-SID in response to a complaint of active violence or officer-initiated enforcement for suspicious activity to include spotting and engaging a known or unknown fugitive. The capabilities and availability of L-SID is immediate to support enforcement activities from start to finish with real-time scene situation awareness. In the event of an exacerbated or elevating out of control scene, arriving support officers can synch into the scene situational awareness video stream. If the situation requires, responders can be formed into 2 to 5 men tactical areas-of-responsibility (AOR). Each AOR can deploy a dedicated L-SID drone/UAS to enhance their vantage point and feed scene video directly to its members HDGs.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
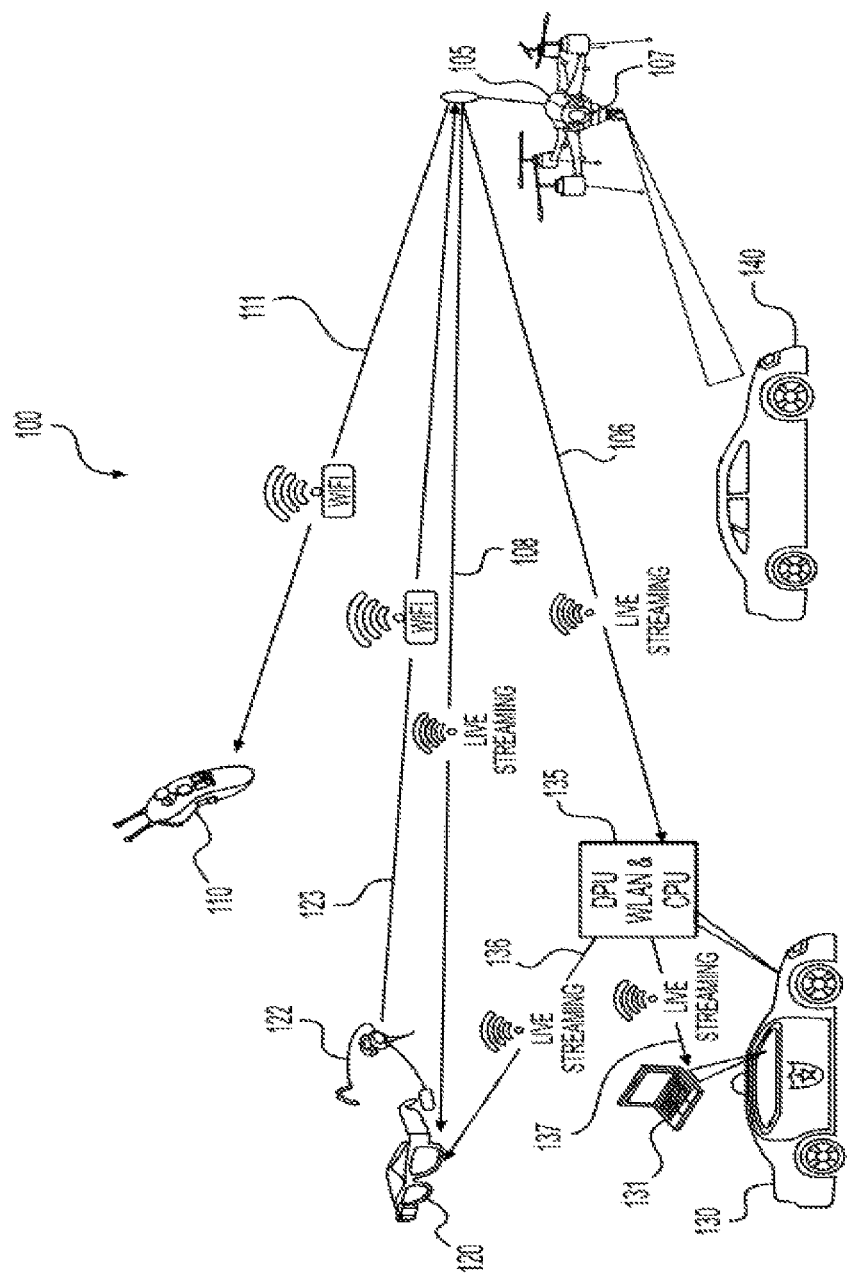
FIG. 1A shows a system diagram that illustrates the L-SID system components and wireless network interfaces in an operational scenario.

The following description with reference to the accompany drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

When you consider the responsibility of policing urban, suburban, and even rural areas each squad car on patrol can become a first-to-scene (FTS) for a multitude of situations. In non-preplanned enforcement activities, it is unlikely that the designated drone/UAS team of police departments can make a timely response. The L-SID capability provides a process and toolkit for law enforcement and security use only to be implemented at the squad car level. It enables a real-time FTS capability to pre-screen a scene identifying hazards and to mitigate the possibility of ambush during an on-foot approach. This is facilitated with a drone/UAS 105 being deployed from a squad car's 130 launch/recovery pad (LRP) 402 that consists of clear see dim materials and RFID, unfolds and or slides out from a door mounting, and is controlled via WLAN 111 with a one hand officer-initiated pistol grip drone controller unit (PCU) 110. As the drone/UAS 105 maneuvers to its destination the officer observes a continuous live stream of drone video via WLAN 108, 136 to the officer worn augmented video HUD glasses (HDG) 120. As the drone maneuvers the scene the officer has the ability zoom in on items of particular interest using control buttons on the PCU 110, and as necessary provide verbal commands to the scene by switching to PCU 110 loudspeaker switch to drone position and begin speaking into the microphone headset (MIC) 122 and the commands will transmitted via WLAN 123 and broadcasted in real-time to the scene via the drone/UAS onboard loudspeaker 107. In the case of a vehicle with tinted windows, the system applies real-time processing techniques to allow visibility through automobile tinted windows. The system also allows visibility through a building's tinted window. Once the officer deems a scene safe to begin a foot approach 180 the drone is strategically positioned at the scene providing continuous live streaming scene video to the officer's HDG 120 during his foot approach 180, as well as the return trip back to the squad car at the completion of the enforcement event 188. A single squad car L-SID encrypted network 100 has the bandwidth and channeling capability to accommodate multiple HDGs 120 to enable additional officers arriving to the scene to synch into the scene's live streaming video for approach situational awareness. The flexibility of the L-SID system capability enables tactical scenarios that leverages the squad car level implementation as described below in FIG. 8. The L-SID system comprises five component that are connected via an encrypted network using WiFi Alliance's Wi-Fi Protected Access 3 (WPA3) protection mechanisms. Each L-SID system components is durable and require an Ingress Protection (IP) rating of IP54 or greater to provide a substantially reliable degree of operation during inclement weather conditions.

There is shown in FIG. 1A a pictorial system flow diagram of a process 100 that illustrates the overall operational system network and component interfaces. In this embodiment is an operational scenario for a traffic or suspicious vehicle stop illustrating the L-SID private encrypted network communications and data process 100. Whereas a drone/UAS 105 launched from police cruiser/squad car 130 and controlled via WLAN 111 with drone remote controller PCU 110 on a mission to pre-screen the scene of target vehicle 140 to enable a safe on foot approach 180. Drone/UAS 105 captures and broadcasts live streaming video of target vehicle 140, to the network data processing unit (DPU) 135 via WLAN 106 where image enhancement techniques are applied to enable visibility through tinted windows of the video captured from target vehicle 140. This video processed in near real-time, is transmitted to the heads-up-display glasses (HDG) 120 via WLAN 136. Live streaming video of the target vehicle 140 is transmitted from drone/UAS 105 antenna(s) 2 to both the DPU 135 and HDG 120 simultaneously. However, the video transmitted from the DPU 135 to the HDG 120 via WLAN 136 is prioritized whenever processing is required and is substantially transmitted without noticeable delay. If there is substantially no significant video processing required, the video transmitted from the drone/UAS 105 antenna(s) 2 to the HDG 120 via the WLAN 108 will be displayed. DPU 135 also transmits the processed scene video, if required, or otherwise to the squad car on-board computer 131 via WLAN 137. In some instances, a direct connection may be afforded between the DPU 135 and the squad car on-board computer 131. These data processing sequence occurs substantially in real-time. Therefore, video data received by the officer worn HDG 120 may dictate a need for verbal commands to target vehicle 140 for scene safety. This is accomplished by the officer enabling the drone loudspeaker 5 by placing the PCU 110 drone loudspeaker switch into drone position and the officer speaks his commands into the microphone headset (MIC) 122 to transmit commands via WLAN 123 to drone/UAS 105 antennas) 2 and to the onboard loudspeaker 107 for broadcast. All scene data including video, drone telemetry and GPS position data is further disseminated from squad car on-board computer 131 to transmitted to headquarters/command center via the designated law enforcement network.

Figure 1B:
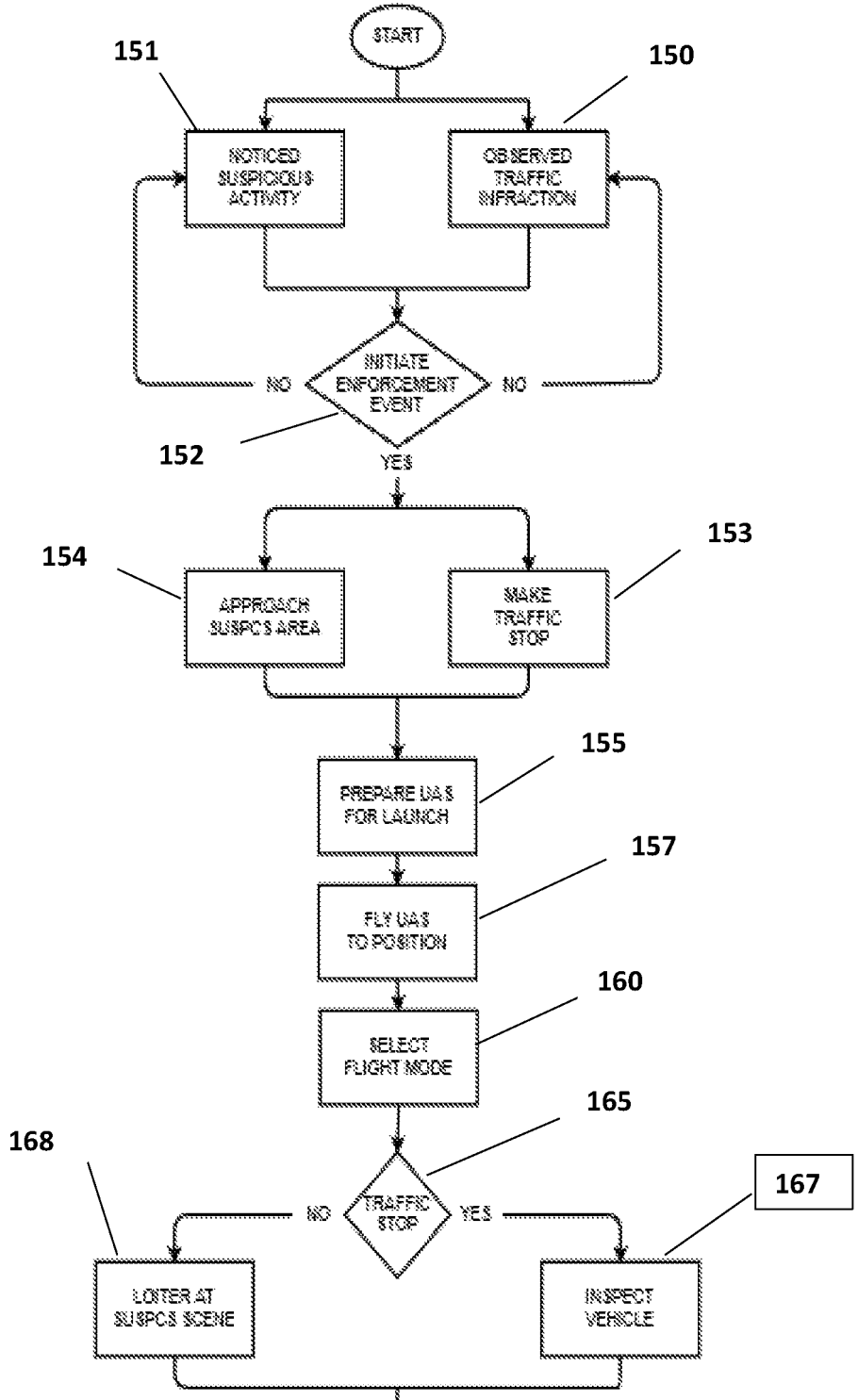
FIG. 1B shows a diagram that illustrates the L-SID decision tree and operational process flow.

As shown in FIG. 1B is one version of several possible decision tree sequences that may be followed to represent the operational process flow characterized in 100. Sequences in a decision tree are dependent on how the drone/UAS 105 semi-autonomous and or autonomous flight routines are programmed to execute certain functions. For example, how and when the preprogrammed flight modes are selected will impact how a decision tree is articulated. This version of the representative process decision tree considers two observations 150, 151 and associated event sequences. At event observation 150 the officer may have observed events that include erratic or aggressive operation of a vehicle on the roadway, suspicious driving and maneuvering, vehicle suspiciously parked, or a vehicle attempting to elude. At event 152 an enforcement decision is made resulting in executing a traffic stop, or a physical investigation of a parked vehicle at 153. At event 151 the officer may notice unusual activity, come upon a disturbance, or respond to a situation or dispatch that can present unknown hazards. At event 152 an enforcement decision is made resulting in an approach to the area to define a scene at 154. Both events 150 and 151 determines the need for an enforcement activity 152 and triggers events 153 and 154 respectively which will kick-off actual use of the L-SID capability. At event 155 the officer executes the actions required to get the drone/UAS 105 in the air and begin the streaming of scene video information to the officer worn HDG 120. At event 157, while viewing the video and data displayed on his HDG 120, the officer maneuvers the drone/UAS 105 into initial scene position, FIG. 5 position 504 or scenario events 151, 152, 154, 168, officer selects best vantage point, using the drone controller PCU 110. At event 160, the officer uses PCU 110 to selects a preprogrammed flight mode routine. At event 165 a traffic stop analogy is used to determine which flight mode to select. If the analogy determination is yes, the inspect vehicle flight mode 167 is selected. If the analogy determination is no, the loiter at scene flight mode 168 is selected. This is accomplished by using the flight mode selector switch on the PCU 110 resulting in the drone/UAS 105 flying a preprogrammed flight routine while continuing to live stream scene video to officer worn HDG 120.

Figure 1C:
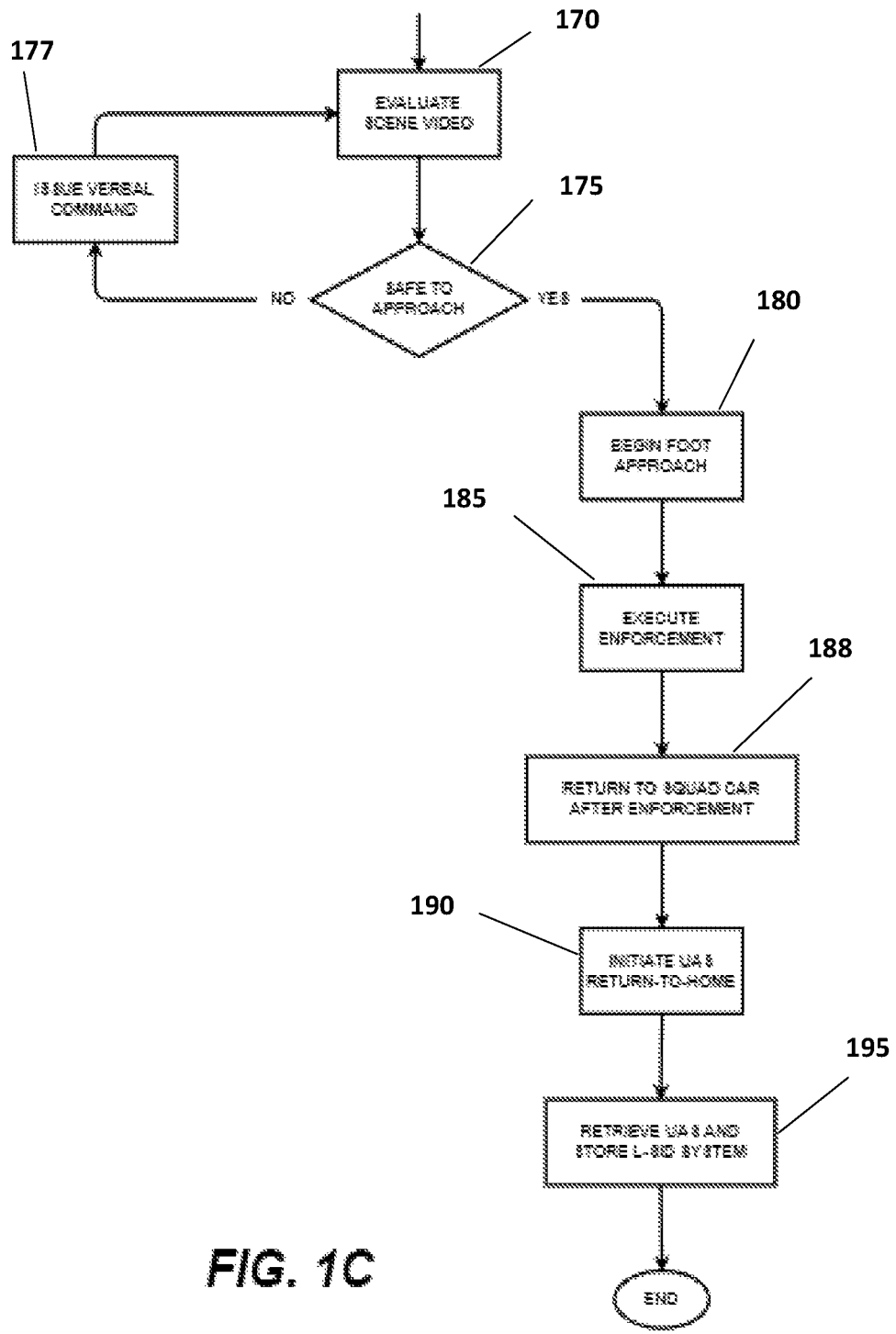
FIG. 1C shows a continuation of diagram that illustrates the L-SID decision tree and operational process flow.

FIG. 1C is a continuation of the decision tree process that began in FIG. 1B. There are many ways, when, and where decision sequences can be used to make a flight mode routine selection. It could be made earlier in this decision tree sequence, but this is one version of many representative examples. At event 170 the officer is at a key point in evaluating the scene video to begin an on-foot approach 180. At event 175 a decision whether there is enough information for a safe approach is considered. If there is not enough evidence for a safe approach or should evidence come up presenting a potential risk, the officer can issue verbal commands or instructions 177 to the scene that is broadcasted via the drone/UAS 105 onboard loudspeaker 107. This is accomplished by officer placing the PCU 110 loudspeaker switch to the drone position followed by officer speaking his commands into the microphone headset (MIC) 122. Telemetry information transmitted to the HDG 120 include display of PCU 110 switch positions to aid officer operation. The PCU 110 loudspeaker switch enables the officer commands to be transmitted directly from MIC 122 to the drone/UAS 105 onboard loudspeaker 107. Under event 150 scenario, the following are examples of information that may require issue of verbal commands 177 to mitigate scene hazards; Live streaming video of a car with tinted or un-tinted windows revealing occupants concealing something, possibly a weapon, and or other suspicious activity. Another example may be video revealing a person hiding behind an obstruction, a person with a weapon in their hands or nearby, a person holding a pit bulldog ready to release, and or other forms of a scene hazard or potential trap. Under event 151 scenario, while the officer is monitoring the scene there is live streaming video revealing evidence of several individuals in a suspicious vehicle, or a number of individuals being belligerent in an unruly congregation on a scene, in which event the officer will request backup, while maintaining a safe standoff and continually monitoring scene situational awareness. After issuing verbal commands 177 to the scene and once a scene is determined safe to approach the officer begins an on-foot approach 180 while continuing to monitor the situational awareness live streaming video displayed on his HDG 120. Each of these examples may require the issue of verbal commands 177 to gain or maintain control of the scene to ensure safety. Upon arriving in scene, the officer may store the PCU 110 on his belt or in an aim band holster, if that was not done during the on-foot approach. This will free both hands to execute required enforcement activities 185 until complete. Some examples of enforcement activities that requires both hands to be free, may include issuing a citation, conducting a sobriety test, taking someone into custody. The officer may need to draw his weapon, or after engaging the drone/UAS 105 at altitude to improve visibility vantage point and calling for backup support, in situation of fleeing suspects, the need to engage a brief foot pursuit to maintain situational awareness. In many instances an officer may need to call for backup support while continuing to monitor the scene situational live streaming video displayed on the HDG 120. As the enforcement activities are completed 188 and the officer begins egress for return to squad car. Officer will continue to monitor live streaming video of the scene on the HDG 120 to ensure safe egress. At event 190 as the officer returns to his squad car, the officer will use the PCU 110 to initiate return-to-home releasing the drone/UAS 105 from its scene hover or loiter position for a return flight and retrieval at the squad car 140. At event 195 officer returns drone/UAS 105 to squad car 130 overhead storage rack FIG. 4, 401 and returns the drone/UAS launch/recovery pad platform (LRP) FIG. 4, 402 to stored position.

Figure 1D:
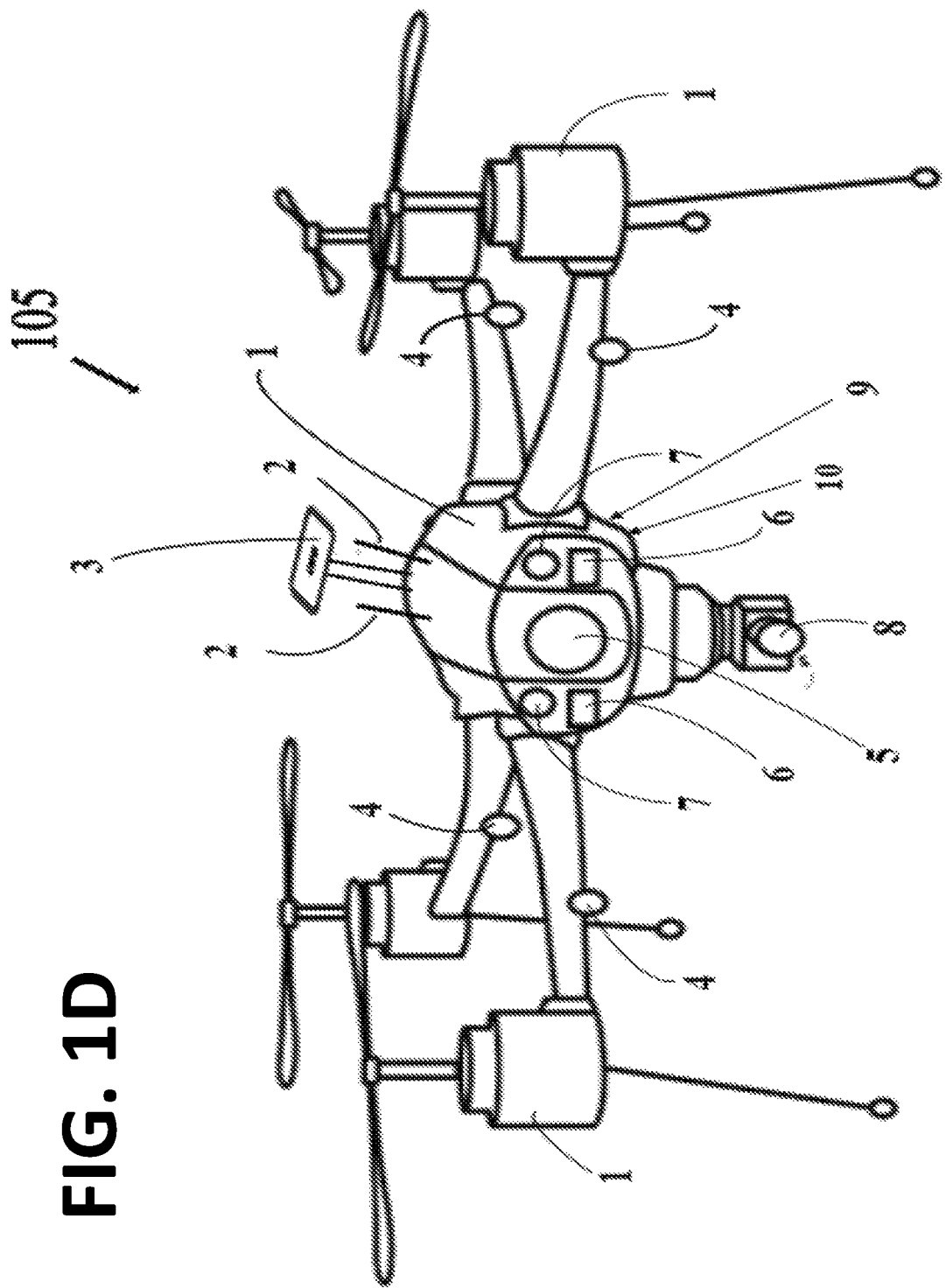
FIG. 1D shows a perspective view of the L-SID drone/UAS that depicts the specified enclosures and configuration components required to perform its functional requirements.

As shown in. FIG. 1D is one representation of the L-SID drone/UAS 105 that points out the basic component configuration required to perform the mission set. The LSID capability is a system of systems and the drone/UAS 105 is one of five component subsystems. Drone/UAS 105 performs a core and very crucial operational function which requires durability and a high level of availability and reliability. Its mission set includes day and night operations and exposure in inclement weather. Consistent with specific performance and configuration requirements for drone/UAS 105 was a focus on its mechanical casing or enclosure 1 as a critical concealment and protection barrier. A specific ingress protection (IP) standard rating of IP54 is required for the drone/UAS 105 enclosure 1 and influences external component implementations. One example is the sealed base mounting of the drone/UAS 105 wireless communication links transmit and receive antenna(s) 2. These antenna(s) 2 receive and transmit video and data communications between all L-SID system component subsystems. One example is an officer needs to issue verbal commands FIG. 1B, 177 to a scene. This is accomplished by setting a switch position on the PCU drone controller FIG. 1A 110, that sends a signal to the drone/UAS 105 antenna(s) 2 which enables the onboard loudspeaker 5. This sets up a simplex or half duplex communication channel scenario and by the officer speaking into the MIC, FIG. 1A, 122 transmits one-way signals to the drone/UAS 105 antenna(s) 2. These one-way signals are converted and broadcasted by the drone/UAS 105 onboard loudspeaker 5. The combination compass/magnetometer and GPS module 3 is positioned to minimize compass interference and optimize satellite connectivity. The main function of the GPS module 3 is to provide navigation to enable the RTH feature FIG. 1B, 190, which is initiated with the PCU drone controller FIG. 1A, 110. Most of system avionics components reside inside the lower enclosure 1 compartment 9 where the drone/UAS 105 power switch 10 is mounted and houses the specified flight control avionics, drone receiver module, and specified video transmitter. Other required sensors include external facing distance sensors 4 and external facing Optic Flow and RFID tracking sensors mounted in bottom of enclosure 1 compartment 9 (not shown). There is an external dual battery payload station (not shown) positioned at the bottom rear of enclosure 1 that houses 2 LIPO batteries (not shown) to allow extended flight duration of approximately 1.25 hours. Other external or external facing required configuration components include the video camera(s) 8, LED flood lights 6, and blue flashing police lights 7. All external and external facing component must meet IP54 ingress protection rating. A listing of the drone/UAS 105 required configuration components are:

- Complete drone/UAS 105 mechanical casing or enclosure 1 with IP54 ingress protection rating.
- Wireless communication links transmit and receive antenna(s) 2 with sealed base mounts.
- Compass/GPS 3 combination mounted on pod to minimize interference and maximize GPS satellite connectivity.
- External facing ultrasonic or light-based distance sensors 4 and may include other collision avoidance technology.
- Specified drone/UAS 105 Loudspeaker 5.
- LED drone flood lights 6.
- Police alternating blue flashing strobe lights 7.
- Dual Thermal Sensor and 4K Visual Video camera 8.
- Enclosure 1 compartment 9 houses required system avionics components.
  - Programmable 10 DOF flight controller or autopilot system with 32 bit processor, DSM2 or DSMX input, air telemetry, IMU and other onboard sensors, data logging, and dynamic sensor fusion.
  - Drone RF receiver module
  - Video transmitter module (2.4 GHz and 5.8 GHz)
  - External facing Optic Flow sensor
  - External facing RFID seeking sensors to aid, drone/UAS 105 precision landing.

Figure 2:
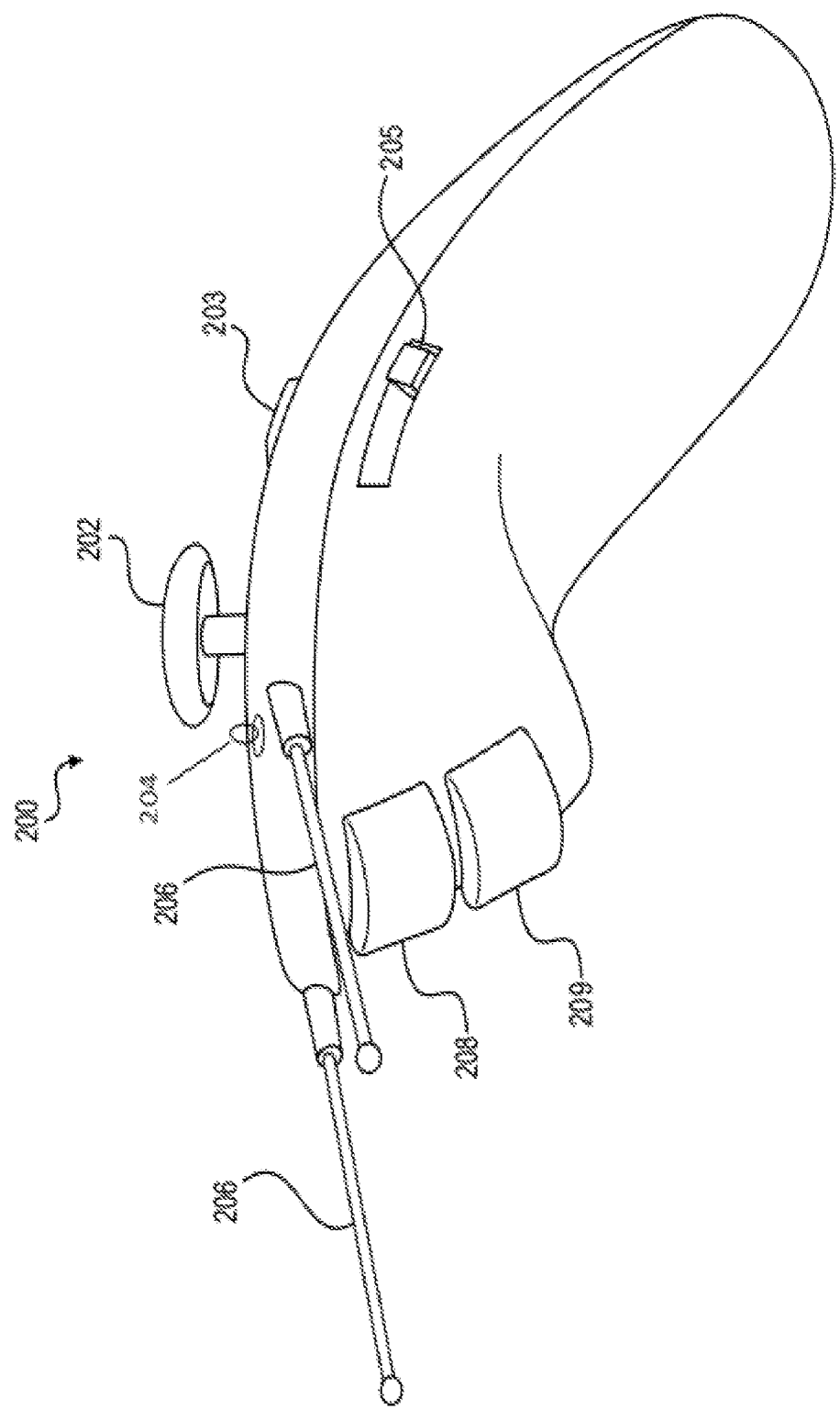
FIG. 2 shows a perspective view of the one-hand pistol grip drone controller unit (PCU) that provides a detailed arrangement of control buttons and trigger switches.

FIG. 2 presents a perspective view representing one version of the PCU 200 that points out the basic controls and switch configurations. The PCU 200 is a remote-control device for use with the L-SID drone/UAS, FIG. 1, 105. It radiates radio frequency (RF) and is subject to compliance with Part 15 of the FCC Rules for class B digital devices. PCU 200 implements a custom form factor that includes most of the standard RC controller functionality. However, many control functions and components may have been combined or re-configured to accommodate the new form factor as well as accommodate new functionality. An example is combining the functions of the standard two joysticks into one joystick 202 control. The PCU 200 power on and power off is activated with toggle switch 204. Once the PCU 200 is activated, it initiates a device synch with the drone/UAS 105 receiver and the receiver awaits follow on control instructions. The banks of three-position slide switches 203 and 205 activate the various functions control features. Trigger switches 208 and 209 activate designated gravity sensor circuits to enable certain remote-control functions. An example functionality would be, compress and hold trigger 208 and physically move (raise or lower) the PCU 200 up or down to increase or decrease the altitude of drone/UAS 105. Alternately, compress and hold trigger 209 and physically move the PCU 200 left or right to reposition the drone/UAS 105 in flight accordingly. In both instances, when PCU 200 triggers 208, or 209 is released the drone/UAS 105 will maintain position in flight until additional inputs are initiated. At the top front of PCU 200 are two antenna(s) 206 that provides the transmit of control instruction to drone/UAS 105 and they also receive telemetric data for PCU 200 processing as needed. The PCU 200 is the primary control apparatus for the drone/UAS 105 and has several storage options for when it is not in use. These options include on the squad car FIG. 1A, 130, interior ceiling overhead storage rack, or the dash mounted holding tray. During enforcement events when officer requires both hands free, the PCU 200 can be holstered on officer's utility belt or in an armband holster.

Figure 3:
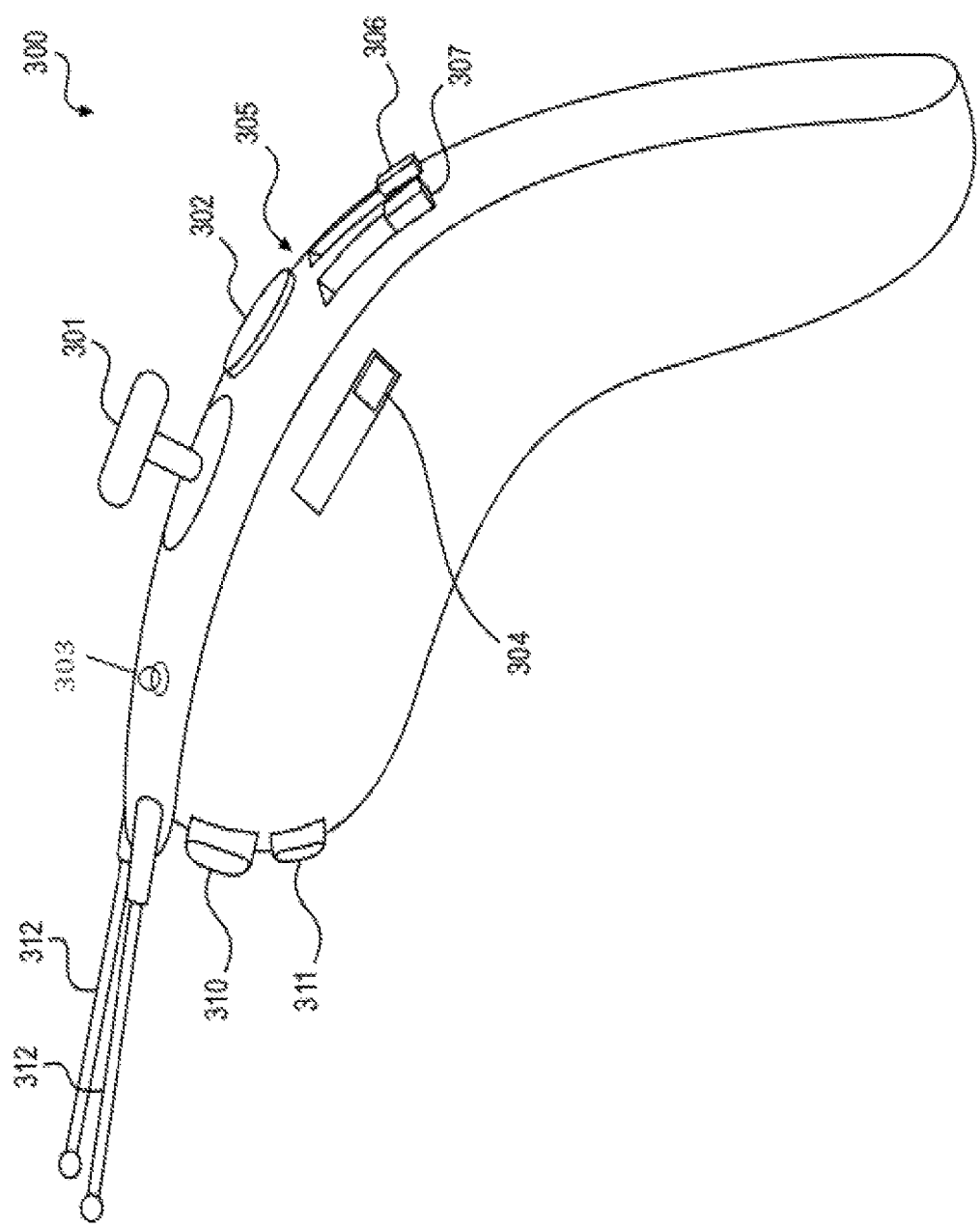
FIG. 3 shows a side view of the one hand PCU.

FIG. 3 provides a side view perspective of the PCU 300 profiling its control features. PCU 300 provides law enforcement officers a simple one hand operation and control capability for the L-SID drone/UAS, FIG. 1, 105. When an officer requires both hands free, the PCU 300 is easily holstered on officer belt or in an arm band holster. The PCU 300 incorporates gravity sensors to facilitate control movement telepathy and interfaces directly with the drone/UAS 105. It has eight control input switches as described below. Toggle switch 303 has two positions, power on and power off, and when power on is activated the PCU 300 initiates a device synch with the drone/UAS 105. The transmit and receive antenna(s) 312 is positioned at the top front of PCU 300. Positioned below the base of antenna(s) 312 are two multi-function trigger switches 310 and 311. These switches activate the control movement telepathy feature of the PCU 300. For example. when the officer compress and hold trigger switch 310 followed by a raising or lowering of the PCU 300 will respectively, instructs the drone/UAS 105 to increase or decrease altitude. Alternately, when the officer compress and hold trigger 311 and physically move the PCU 300 to the left or right, the drone/UAS 105 re-positions accordingly in flight. In both examples above, when the officer releases PCU 300 triggers 310 or 311 drone/UAS 105 will maintain position in flight until additional control inputs are initiated. The multi-function Main Control Stick (MCS) 301 receives its functional mode controls from the three-position slide switch 304. When slide switch 304 is in the rear most position or position 1, this enables the MCS 301 for in-flight maneuver control of drone/UAS 105. For example, Push the MCS 301 Forward to fly the drone/UAS 105 forward, and the further MCS 301 is pushed from the center detent will increase throttle or acceleration. To climb or increase altitude while flying forward, compress and hold trigger switch 310 and slowly raise PCU 300. To descend or decrease altitude slowly lower PCU 300 while keeping trigger switch 310 compressed. During flight, to reposition drone/UAS 105 to the left or right of its position in flight, just compress and hold trigger switch 311 and slowly move PCU 300 left or right and release the trigger when desired position is achieved. To fly drone/UAS 105 in Reverse move MCS 301 to the Rear. To turn around the drone/UAS 105 to fly the reverse azimuth, move and hold the MCS 301 to 90 degrees left or right until drone/UAS 105 rotates and the front is facing to the reverse azimuth. At this point push MCS 301 forward (only the MCS 301 controls are now reversed, not the climb and descend functions of trigger switches 310, 311) for the drone/UAS 105 to continue its flight on the reverse azimuth with its front facing in the path of the reverse azimuth. When slide switch 304 is in the center position or position 2, this enables the MCS 301 to drive the tilt control of the drone/UAS FIG. 1A, 105, camera 107. To tilt the camera 107 upward pull the MCS 301 to the rear. To tilt the camera 107 downward push the MCS 301 forward. To scan the camera 107 left or right, move the MCS 301 left or right respectively. When slide switch 304 is in the forward position or position 3, this enables the MCS 301 to drive the zoom control of the drone/UAS FIG. 1A. 105, camera. 107. To zoom in on an image with camera 107 push the MCS 301 forward. To zoom out on an image with camera 107 pull the MCS 301 to the rear. During the event FIG. 1B, 155, Prepare L-SID for Launch initiates activities that includes officer deploying the squad car FIG. 1A, 130, door mounted launch/recovery pad platform (LRP), followed by removing drone/UAS FIG. 1A, 105 from the squad car 130 ceiling mounted overhead storage rack (OSR), quick inspection and turning on drone/UAS 105 power switch (this action only powers up the electronic, does not start drone/UAS 105 electric motors) and placing in position on the LRP. This activity is followed with the officer putting on the HDG, FIG. 1A, 120 and microphone headset (MIC) FIG. 1A. 122. Then retrieving the PCU 300 from its store and checking to ensure slide switch 304 is in position 1, the power can be turned on with power switch 303 to initiate the synch up with drone/UAS 105. Once the synch is complete the officer depresses the PCU 300, push button switch 302 to start the drone/UAS 105 motors. Upon the officer seeing the live streaming video on the HDG 120 pressing switch 302 again will launch drone/UAS 105 into a hover above the LRP. As indicated in event FIG. 1B, 157 the officer will fly drone/UAS 105 into position on the scene using the PCU 300 MCS 301. At which point the officer places drone/UAS 105 into a hover by placing slide switch 307 forward most to position 3. Switch 307 has three positions, position 1 is the rear-most position and activates the drone/UAS 105 return-to-home (RTH), position 2 or center is a neutral mode, and position 3 the forward most position activates the hover in place mode. Consistent with flying drone/UAS 105 into "initial position 157", and dependent upon the mission, the officer makes a semi-autonomous flight mode selection FIG. 1B, 160. An example flight mode selection is "inspect vehicle" FIG. 1B, 167. This is accomplished by placing PCU 300, slide switch 306 into position 3 or forward-most position. Switch 306 has three positions, position 1 is the rear-most position and activates manual flight mode or operator control, position 2 is the center position or neutral, and position 3 or the forward-most position activates the semi-autonomous flight mode "inspect vehicle". As the officer monitors the scene video and before determining the scene safe to begin an on-foot FIG. 1B, 180, a scene condition is observed that requires the officer to issue scene commands or instructions FIG. 1B, 177. This is accomplished by the officer placing PCU 300 slide switch 305 into position 3 or the forward-most position to enable drone/UAS 105 onboard loudspeaker FIG. 1A, 107. Switch 305 has three positions, position 1 is the rear-most position and turns off the drone/UAS 105 onboard loudspeaker 107, position 2 or center position activates programmed messages or sounds such as a police siren, and position 3 or the forward-most position activates the drone/UAS 105 onboard Loudspeaker 107 to enable using the MIC for the officer to speak and broadcast the commands or instructions.

Figure 4:
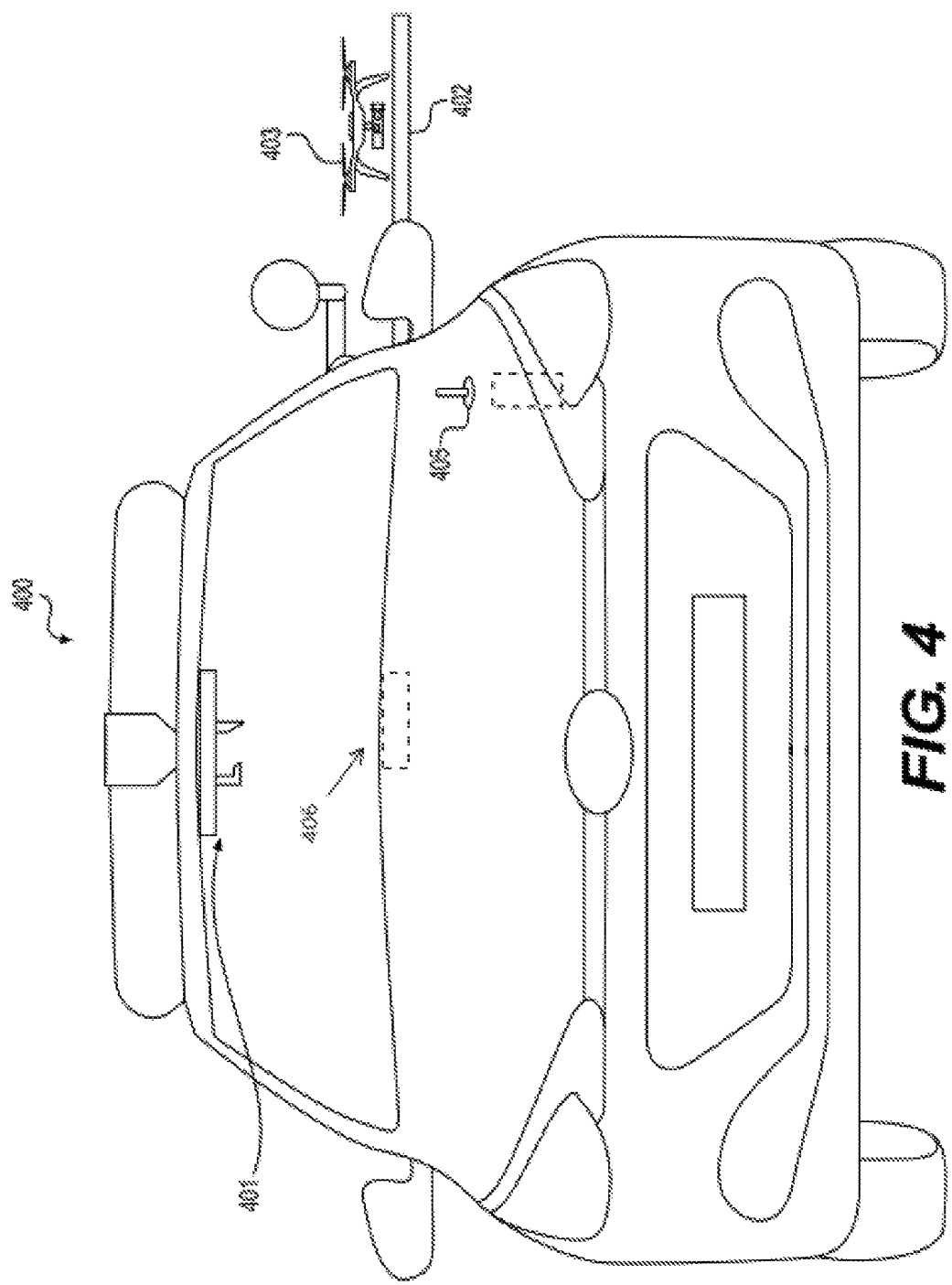
FIG. 4 shows a view from the front of the police cruiser/squad car that illustrates the placement of the interior overhead drone storage rack.

As shown in FIG. 4 is a view from the front of squad car 400 that illustrates the placement of L-SID system components. In this example, the interior ceiling mounted. L-SID drone/UAS 403 overhead storage rack (OSR) 401 and placement is illustrated. The OSR 401 also has attachment to enable recharging and maintaining of a full charge of the battery as installed in drone/UAS 403. OSR 401 also accommodates storage for the drone controller PCU, FIG. 3, 300 and provides recharging and maintaining of a full charge of the battery as installed in the PCU 300. Additionally, OSR 401 accommodates storage for spare batteries for both the drone/UAS 403 and PCU 300. There is a squad car 400 dashboard mounted holding fixture 406 for the temporary storage of the PCU 300, and the officer wearable HDG and MIC FIG. 1A, 120, and 122. Mounted on the left front door of the squad car 400 is the L-SID Launch and Recovery Pad platform (LRP) 402 that is positioned at the door window threshold level profile. The LRP 402 consists of ballistics rated see through material that minimizes obstruction to officer vision or view and incorporates REID technology to aid in the precision landing of the drone/UAS 403 during the return-to-home recovery. One version of LRP 402 may be mounted on the squad car 400 left door interior window-sill threshold and folds and or slides out to form a level platform. Another version of the LRP 402 may be mounted on the squad car 400 left door exterior window-sill threshold or door exterior and folds and or slides out to form a level platform. Also illustrated is one of several installation options for squad car 400 of the networked data processing unit (DPU) 405. The DPU 405 provides crucial network interfacing, data processing, and the system's real-time ability to see through tinted windows, of vehicle and building. It comprises a dual band transceiver, network interface controller, processor front end and supporting electronics and interfaces nested in a sealed enclosure and externally mounted antenna.

Figure 5:
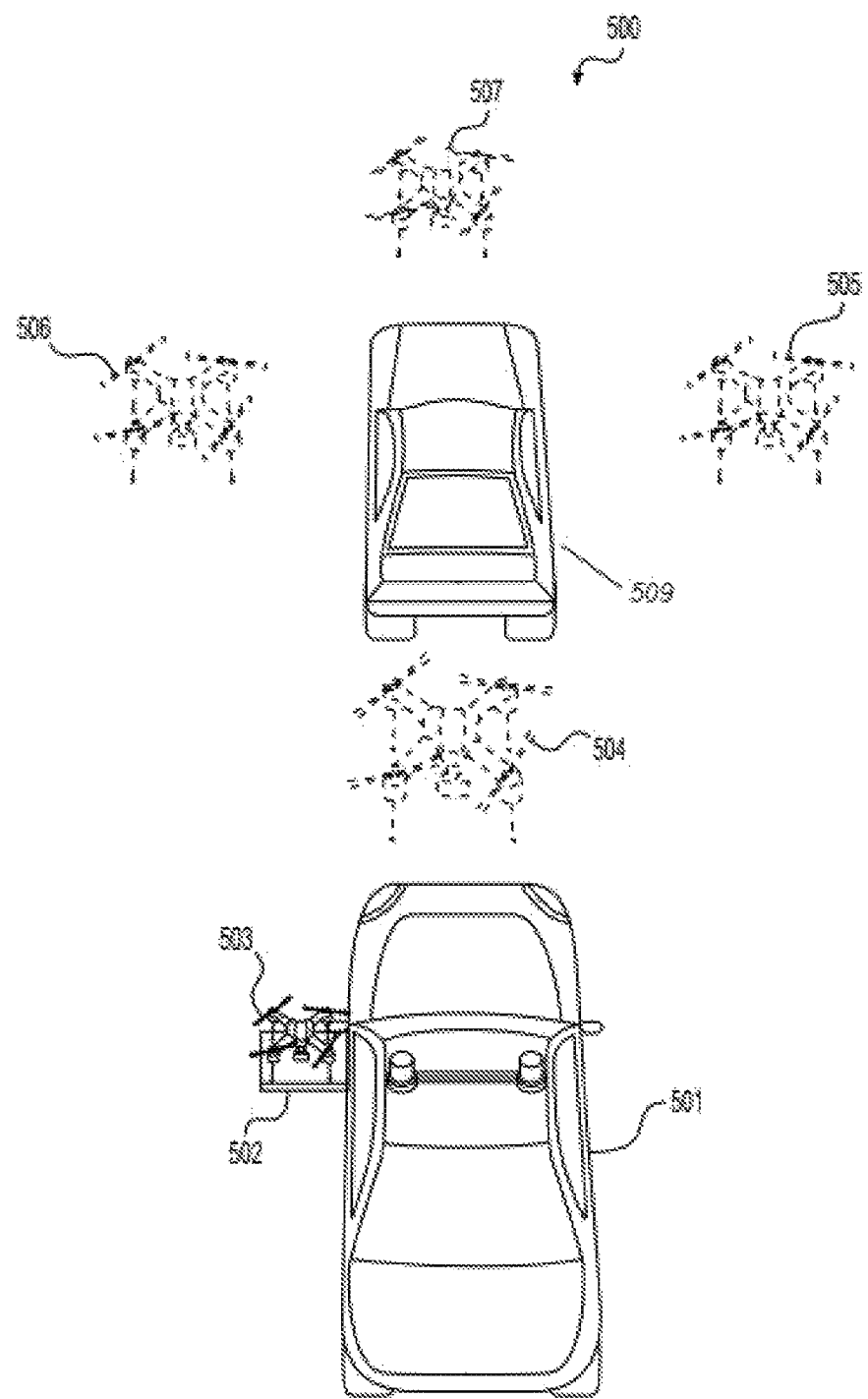
FIG. 5 shows a rear view of the police cruiser/squad car with the drone on the launch/recovery pad (LRP) showing the flight path of the drone around the car that was either pulled over in a traffic stop or suspiciously parked.

As shown FIG. 5 is a top view illustrating the flight path associated a traffic stop or suspicious vehicle scenario. There are several scenarios that embodies the use of a L-SID system to provide a first-to-scene (FTS) with a real-time ability to inspect a scene from a safe vantage. The embodiment as characterized by scene 500 captures the generic process context afforded by L-SID capability. Once an enforcement action is initiated the effort to gain scene intelligence or situational awareness began before the officer deployed the launch/recovery platform (LRP) 502 and placed the drone/UAS 503 in position on the LRP 502. This may have been preceded by procedures that include license plates capture by the squad car onboard camera, if so equipped or other visual aids, and processing that data via the police network database. It also included the removal and initiating power on the drone/UAS 503, putting on the HDG and MIC FIG. 6, 601, and 602, and turning on the PCU FIG. 3, 300, 303. Upon receiving live streaming video from the drone/UAS 503 on the HDG FIG. 6, 601 the officer launches the drone/UAS 503 and maneuvers it to initial scene position 504 to the rear of target vehicle 509. Officer continues to view live streaming video, but there are instances where the officer will temporarily pause or interrupt the flight progression. One example is if the officer views evidence that require the issue of commands or instructions to the scene FIG. 1B, 170, 175, 177. Another example is the officer may pause or hover in place at any position to zoom in on the scene for closer examination before resuming the flight. Upon reaching scene position 504 is the point usually where the officer activates the semi-autonomous flight mode. The drone/UAS 503 continues its flight path to position 505 and on to position 507 and transition to position 506. At this point if the scene is considered safe to begin the on-foot approach FIG. 1B, 180, the drone/UAS 503 returns to position 507 and hovers-in-place at that position unless directed to another vantage point. The officer begins the on-foot approach FIG. 1B, 180, while continually monitoring live streaming scene video via the HDG, FIG. 6, 601. This continues during enforcement execution and the drone/UAS 503 remains in position 507 throughout the officer's return to squad car 501. Upon return the officer initiates the return-to-home with the PCU 300, FIG. 3, 307, commanding the drone/UAS 503 return and execute a precision landing on LRP 502. The precision landing is facilitated with the RFID sensor positioned on the bottom of drone/UAS 503 that coordinated with RFID beacon affixed in the center of the LRP 502. The process is completed with the storage of the HDG, MIC FIG. 1A, 120, 122 and drone/UAS 503 being replaced to the OSR, FIG. 4, 401. The final storage action is return the LRP 502 to its stored position.

Figure 6A:
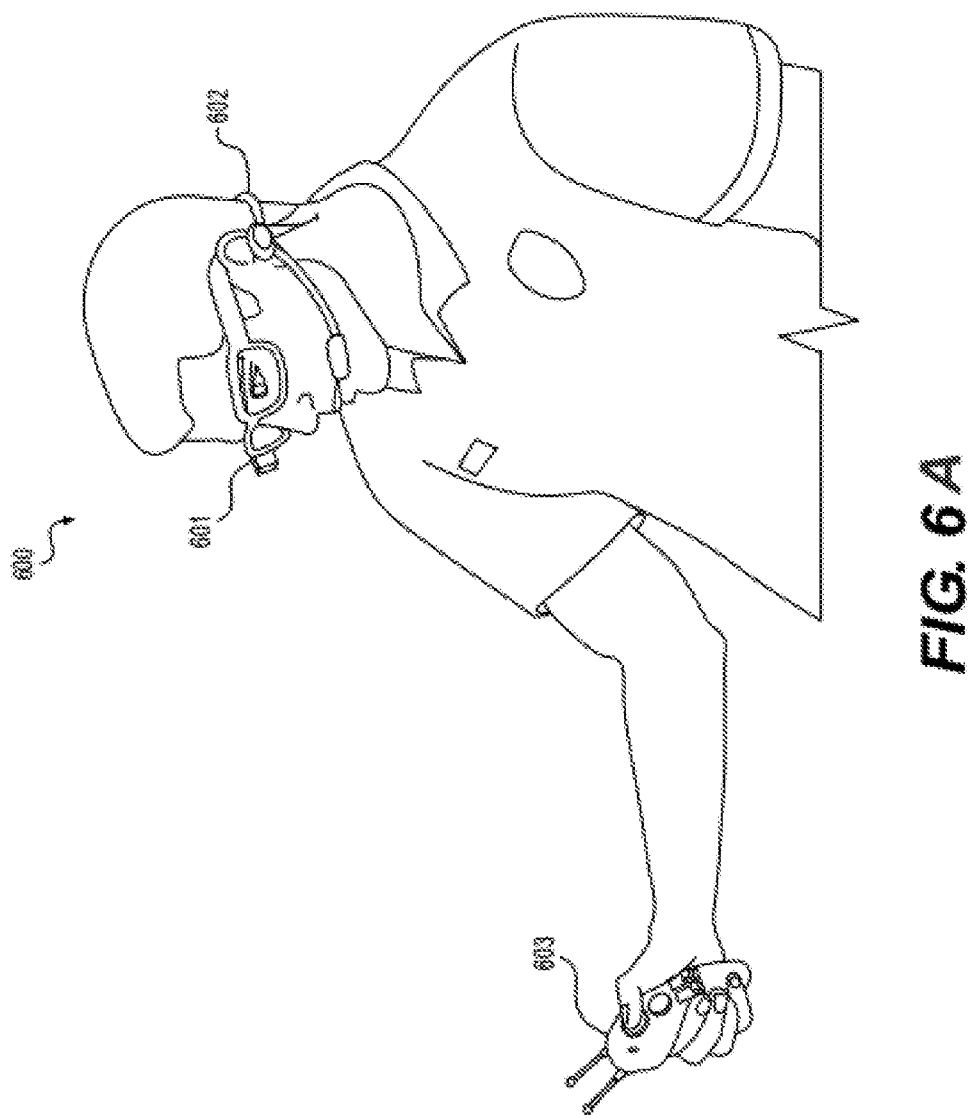
FIG. 6A shows an interior cut out view of the police cruiser/squad car illustrating the officer controlling the drone with the PCU of FIGS. 2 and 3 while wearing the heads-up-display glasses (HDG) and the, microphone headset.

As shown in FIG. 6A is a cutout view that illustrates an officer seated in squad car and performing pre-screen of the scene. This embodiment captures the initial phase of an enforcement process for the FTS equipped with the L-SID capability. Upon launching the drone/UAS 503, FIG. 5 the officer receives real-time live streamed scene video displayed on the heads-up-display glasses or HDG 601. The officer vision is not impaired and has complete freedom of movement to scan the immediate surrounding area. While observing the scene video the officer can pause the flight progression to zoom in for closer examination at any time with drone controller PCU 603. There are switch controls that allow this to occur on the fly. Vehicles or building with tinted window does not present a viewing problem, the system has an image enhancement technique and processing power that enables this capability without noticeable latency. Should the officer observe a situation requiring the issue of commands or instructions to the scene, this can occur by re-positioning switch on the PCU 603 and speaking into the MIC 602.

Figure 6B:
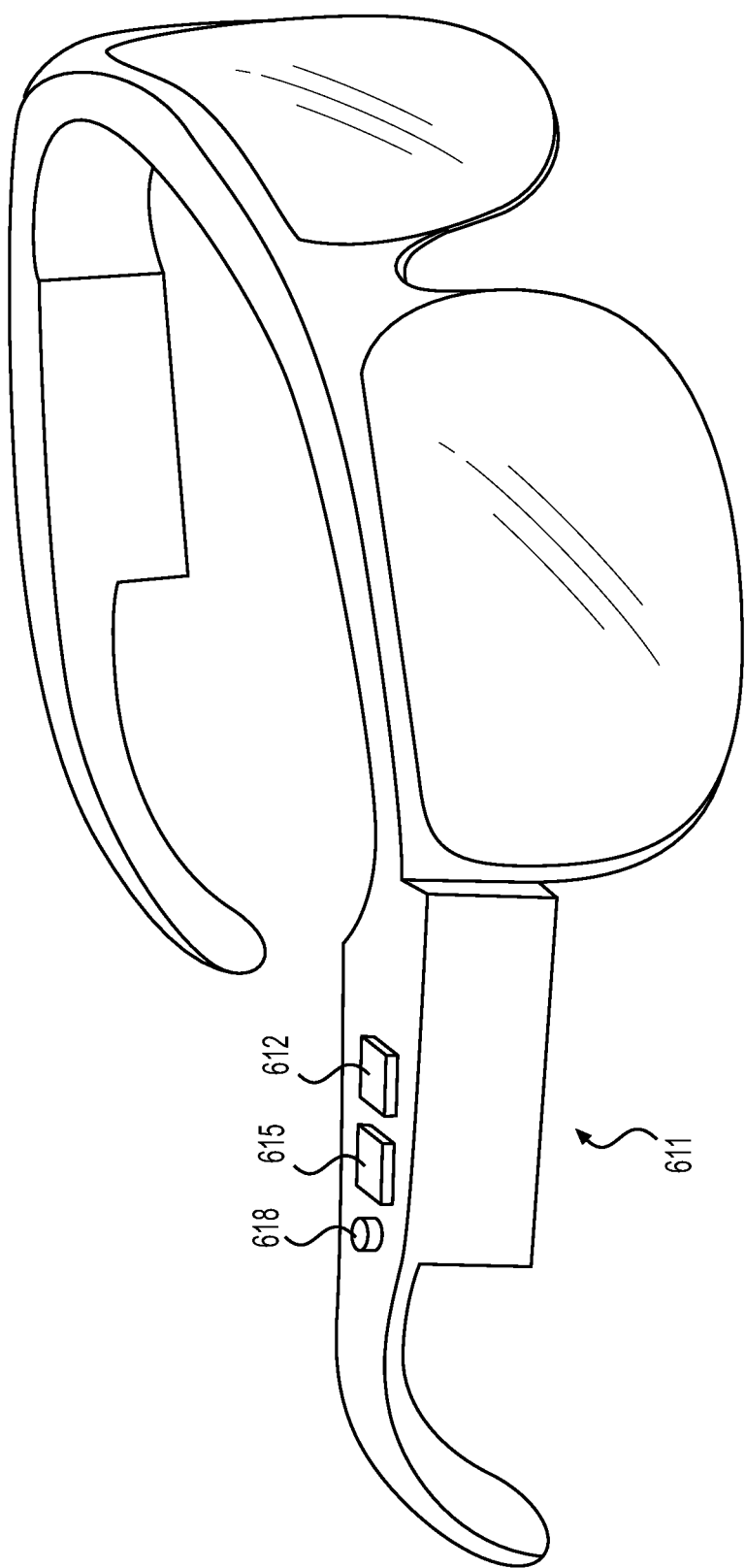
FIG. 6B shows a view that illustrates the placement of the HDG glasses multiple channel selector button.

As shown in FIG. 6B is a view that illustrate the heads-up-display glasses (HDG) controls and electronics module. The HDG 610 is essentially a very powerful wearable computer with features equivalent to a tablet or notebook computer. However, this embodiment of the HDG 610 is specifically configured for the purposes of the L-SID capability to include durability, reliability, and operational environment standards. HDG 610 is activated by depressing power button 618 which initiates the display screen and executes a synch routine that identifies devices. The actual synching is completed with the use of the synch control button 612 that use a series of touch sequences to stroll, select, and activate. The mode select button uses a similar touch sequence to select various modes to include features that optimize the display for user's day and night operations conveniences. The core electronics are housed in compartment 611. The HDG 610 provides a core functionality in the L-SID system of systems capability.

Figure 7:
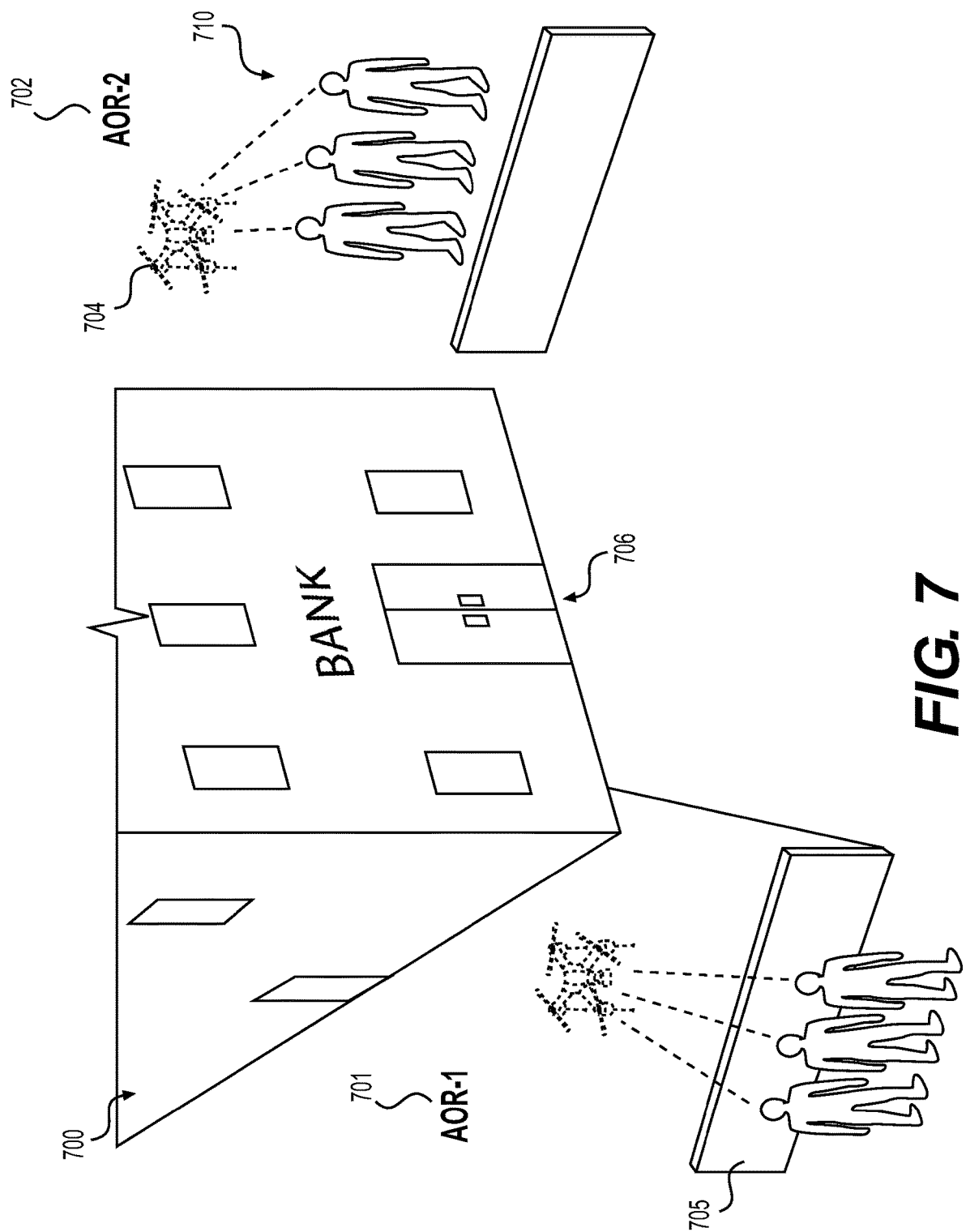
FIG. 7 shows a diagram of the AOR concept enabled by L-SID subnet channeling that enable up to five-man teams or five HDGs synching up to L-SID network.

As shown in FIG. 7 is an illustration depicting the area of responsibility (AOR) concept enabled by the L-SID subnet channeling that permit teams of up to five member or five HDG, FIG. 6B, 610 to synch up to a L-SID network. The scenario illustrated in 700 is a notional representation of the employment of an AOR for the purposes of providing a graphic to visualize the interface and relationship. AOR-1 701 depict a drone/UAS 703, that is providing a team of 5 officers 705 live streaming scene video on their individual worn HDG, FIG. 6A, 601. Each member receives situational awareness enabling for smarter and safer enforcement in extremely dangerous situations or situations that can escalate to a point of extreme danger. AOR-2 702 is a similar arrangement of a five-man team being feed live video information as the situation unfolds. In both cases an undesired situation was occurring at the bank 706. The officer, that was first-to-scene saw the suspicious activity put his L-SID drone/UAS 704 asset in the air to get a closer examination. The Bank 706 windows were tinted but the L-SID technology enabled the ability to see through the tinted windows and reveal approximately nine armed suspects carrying out the robbery. The video information was transmitted in real-time to the local precinct who immediately dispatched support. The situation was critical and as the support team arrives, they were coordinated into tactical areas of responsibility to surround the facility and formed the second team. There were 10 squad cars that arrived on the scene and each was outfitted with L-SID. To preserve resources a plan was coordinated for a replacement strategy to swap out drones/UASs as batteries depleted. This would maximize ability to maintain drone/UASs in the air. Due to the situation the designated agency drone team where summoned to bring in the larger drones to provide coverage for an extended area as this event expanded. The designated drone teams cannot respond on a short notice due to the planning and airspace coordination that is required for the large drone that fly at higher altitudes. The L-SID system routine flight profiles are between 15 and 35 feet above ground level. This is specifically because of the L-SID operational mission set. L-SID operations will provide an expanded capability being the first-to-scene capability that allow an immediate standoff capability to screen or scout the scene. After the second AOR 702 was assembled the drone/ UASs 703, 704, were used to give commands to the suspect via the drone/UAS onboard loudspeaker system. The suspects were surprised and eventually surrendered without shots fired. This is just an example fictional scenario to demonstrate the unique capability of the L-SID system. The capabilities as well as the safety processes and procedural methodology that can be afforded at the squad car level is the value proposition. Examples include the possibility to reduce the use of deadly force by not putting officers into unpredictable or unsafe situations and providing a realistic capability that will enhance enforcement transparency.

What I claim as my invent is:

1. A system for law enforcement standoff inspection to pre-screen and maintain situational awareness of a scene for a first-to-scene responder prior to scene entry wherein the system consists of:
- a drone configured to capture and broadcast live streaming video of a scene of interest over an encrypted WiFi local area network (LAN) to a network data processing unit and to a user worn display apparatus (HDG), wherein the network data processing unit is nested in a sealed enclosure with externally mounted antenna, and comprises: a dual band transceiver, network interface controller, processor, and supporting electronics; wherein the drone comprises: a drone power switch that enables drone flight control avionics, a receiver module configured to receive drone flight control commands, a transmitter module configured to transmit live streaming video data, antennas configured to transmit live streaming video over the encrypted WiFi LAN, a drone loudspeaker configured to broadcast audio commands to the scene of interest over a radio frequency (RF) channel, a camera device configured to capture both visible and infrared video of the scene of interest over the encrypted WiFi LAN, blue flashing police lights, and external facing sensors that include radio frequency identification sensors;
- a pistol grip controller (PCU) configured as a primary drone control apparatus and configured to sync with the drone, transmit control instructions to initiate drone flight control maneuvers, pre-programmed flight modes and camera controls, and activate the drone loudspeaker, wherein the PCU comprises: a power toggle switch to activate the PCU and initiate synching with the drone, a circular push button switch configured to, when pressed once to start drone motors and when pressed again to launch the drone into a hover above a door mounted launch and recovery platform, a first trigger switch configured to, when compressed, held, and raised up, to increase an altitude of the drone and when compressed, held, and lowered, to decrease an altitude of the drone, a second trigger switch configured to, when compressed, held, and moved left or right, to reposition the drone accordingly, a first slide switch configured to control a tilt and zoom of the camera device, a second slide switch configured to initiate a drone hover function and drone return-to-home function, a third slide switch configured to enable the drone loudspeaker and enable a police siren, and a fourth slide switch configured to initiate a drone semi-autonomous flight mode or manual flight mode;
- and a multi-function main control stick (MCS) configured to receive functional mode controls from the first slide switch, wherein having the first slide switch in a rear most position enables the MCS to control in-flight maneuvers of the drone, wherein having the first slide switch in a center position enables the MCS to drive tilt and scan controls of the camera device, and wherein having the first slide switch in a forward position enables the MCS to drive zoom control of the camera device.

2. The system of claim 1, wherein the HDG is configured to receive live streaming video data over the encrypted WiFi LAN from the camera device for display on the HDG.

3. The system of claim 1, wherein the HDG further comprises a power button to enable or disable the HDG.

4. The system of claim 1, wherein the HDG further comprises a microphone headset configured to have a direct link to the drone loudspeaker to transmit audio data to the drone loudspeaker for broadcast to the scene of interest.

5. The system of claim 1, wherein the door mounted launch and recovery platform is attached to a left front door of a squad car.

6. The system of claim 1, wherein the door mounted launch and recovery platform comprises: ballistics rated see-through material, a RFID, and an overhead storage rack.

7. The system of claim 6, wherein the overhead storage rack is mounted to an interior ceiling of a squad car and wherein the overhead storage rack comprises:

an attachment to enable recharging of a drone battery;
a storage configured to store the HDG and spare drone batteries.

\* \* \* \* \*